(12) United States Patent
Paleologu et al.

(10) Patent No.: US 9,081,753 B2
(45) Date of Patent: Jul. 14, 2015

(54) VIRTUAL DISK RECOVERY AND REDISTRIBUTION

(71) Applicant: Microsoft Corporation, Redmond, WA (US)

(72) Inventors: Emanuel Paleologu, Kirkland, WA (US); Shiv K. Rajpal, Sammamish, WA (US); Karan Mehra, Sammamish, WA (US); Surendra Verma, Bellevue, WA (US); Nandagopal Kirubanandan, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 13/830,137

(22) Filed: Mar. 14, 2013

(65) Prior Publication Data

US 2014/0281692 A1    Sep. 18, 2014

(51) Int. Cl.
| | |
|---|---|
| G06F 11/00 | (2006.01) |
| G06F 11/20 | (2006.01) |
| G06F 11/10 | (2006.01) |
| G06F 11/16 | (2006.01) |

(52) U.S. Cl.
CPC ........ *G06F 11/2056* (2013.01); *G06F 11/1076* (2013.01); *G06F 11/1088* (2013.01); *G06F 11/1658* (2013.01); *G06F 11/2046* (2013.01); *G06F 11/2089* (2013.01); *G06F 11/2094* (2013.01)

(58) Field of Classification Search
CPC ... G06F 11/2089; G06F 3/0689; G06F 12/02; G06F 11/2046; G06F 11/1076; G06F 11/2094; G06F 11/1088
See application file for complete search history.

(56) References Cited

U.S. PATENT DOCUMENTS

| | | | |
|---|---|---|---|
| 5,210,866 A | 5/1993 | Milligan et al. | |
| 6,678,788 B1 * | 1/2004 | O'Connell | 711/114 |
| 7,657,796 B1 * | 2/2010 | Kaiser et al. | 714/54 |
| 8,099,623 B1 | 1/2012 | Li et al. | |
| 8,289,641 B1 | 10/2012 | Emami | |
| 8,321,645 B2 | 11/2012 | Rabii et al. | |
| 2002/0049923 A1 | 4/2002 | Kanazawa et al. | |
| 2005/0268147 A1 * | 12/2005 | Yamamoto et al. | 714/2 |

(Continued)

OTHER PUBLICATIONS

"International Search Report & Written Opinion for PCT Application No. PCT/US2014/021459", Mailed Date: Jul. 22, 2014, Filed Date: Mar. 7, 2014, 11 Pages.

(Continued)

*Primary Examiner* — Charles Ehne
(74) *Attorney, Agent, or Firm* — Sunah Lee; Kate Drakos; Micky Minhas

(57) ABSTRACT

Techniques for recovery and redistribution of data from a virtual disk storage system are described herein. In one or more implementations, a storage scheme derived for a virtual disk configuration is configured to implement various recovery and redistribution designed to improve recovery performance. The storage scheme implements one or more allocation techniques to produce substantially uniform or nearly uniform distributions of data across physical storage devices associated with a virtual disk. The allocation facilitates concurrent regeneration and rebalancing operations for recovery of data in the event of failures. Additionally, the storage scheme is configured to implements parallelization techniques to perform the concurrent operations including but not limited to controlling multiple parallel read/writes during recovery.

20 Claims, 8 Drawing Sheets

(56) References Cited

U.S. PATENT DOCUMENTS

| | | | |
|---|---|---|---|
| 2007/0220313 A1* | 9/2007 | Katsuragi et al. | 714/6 |
| 2008/0126844 A1 | 5/2008 | Morita et al. | |
| 2010/0017647 A1* | 1/2010 | Callaway et al. | 714/4 |
| 2010/0218038 A1* | 8/2010 | Ikeuchi et al. | 714/6 |
| 2011/0010599 A1 | 1/2011 | Goel et al. | |

OTHER PUBLICATIONS

Merchant, et al., "Analytic Modeling of Clustered RAID with Mapping Based on Nearly Random Permutation", In IEEE Transactions on Computers, vol. 45, Issue 3, Mar. 1996, pp. 367-373.

Menon, et al., "Distributed Sparing in Disk Arrays", In IEEE Thirty-Seventh Computer Society International Conference on Digest of Papers, Feb. 24, 1992, pp. 410-421.

Massiglia, et al., "RAID and Parallelism", The Raidbook: A Source Book for Raid Technology, Feb. 1, 1997, pp. 169-178.

"Virtual Disk Service is transitioning to Windows Storage Management API (Windows)", Retrieved from <http://msdn.microsoft.com/en-us/library/windows/desktop/hh848071(v=vs.85).aspx> on Feb. 6, 2013, ( Nov. 28, 2012),2 pages.

Jiang, et al., "Are Disks the Dominant Contributor for Storage Failures? A Comprehensive Study of Storage Subsystem Failure Characteristics", *6th USENIX Conference on File and Storage Technologies*, (Feb. 26, 2008),pp. 111-125.

Sinofsky, Steven "Virtualizing storage for scale, resiliency, and efficiency", Retrieved from <http://blogs.msdn.com/b/b8/archive/2012/01/05/virtualizing-storage-for-scale-resiliency-and-efficiency.aspx> on Feb. 5, 2013, (Jan. 6, 2012), 19 pages.

Sundaram, Rajesh "The Private Lives of Disk Drives", Retrieved from <http://partners.netapp.com/go/techontap/matl/sample/0206tot_resiliency.html> on Feb. 5, 2013, (Feb. 2006),4 Pages.

Wildani, et al., "Protecting Against Rare Event Failures in Archival Systems", *IEEE International Symposium on Modeling, Analysis & Simulation of Computer and Telecommunication Systems*, (Sep. 21, 2009), 11 pages.

"Second Written Opinion", Application No. PCT/US2014/021459, Jan. 23, 2015, 6 Pages.

* cited by examiner

400 ⟶

402
Expose options for configuration of a virtual disk across multiple physical storage devices selectable to control an amount of redundancy data to store for resiliency of client data stored on the virtual disk

↓

404
Configure the virtual disk for storage of the client data along with redundancy data across the multiple physical storage devices in accordance with the amount of redundancy data to store for resiliency that is selected via the option

VIRTUAL DISK RECOVERY AND REDISTRIBUTION

BACKGROUND

Users are increasingly using virtualized storage systems that provide scalable local storage and/or storage "in the cloud" for client data (e.g., documents, application files, photos, mobile uploads, audio/video files, etc.). For example, a virtual drive or disk may be configured across multiple physical storage devices. This may enable a user to set-up a selectable amount of storage for a virtual drive, increase or decrease the storage over time, change configuration parameters for the virtual drive, and so forth.

One challenge associated with storage systems in general and with virtualized storage systems in particular is ensuring resiliency of stored data against hardware failures. A storage system is made resilient by storing multiple copies of the data and/or redundancy data (e.g., checksums, parity data, or other compressed forms of the data) that may be used to recover portions of the data located on devices that fail. Mirroring is a traditional approach in which a data is replicated completely on multiple devices that store copies of the same data. Recovery in a mirrored system is trivial, however, mirroring is relatively expensive and inefficient since enough storage space to accommodate multiple full copies of data is consumed and storage devices storing the mirrored copies are rarely used.

Another traditional approach involves storing a determined amount of redundancy data that minimizes the amount of storage consumed while still enabling recovery of the data with a number of storage device failures at or below a specified tolerance. This approach maximizes storage efficiency by using a minimal amount of redundancy data, but may increase recovery time to unacceptable levels since using less redundancy data generally increases the time it takes to reconstruct data that is lost when a device fails. Further, different consumers may want to set up storage systems differently and may have different configuration constraints (e.g., budget, up-time goals, available physical space, etc.) that may be difficult to adhere to using either of the approaches enumerated. Accordingly, traditional data resiliency techniques provide limited, fixed options that may not satisfy the demands of some consumers for flexible and scalable virtualized storage that doesn't cost too much and/or is able to recover from failures reasonably fast.

In the event of a failure, unrecoverable data loss may still occur even for a resilient system if additional failures occur before the storage system is restored to a resilient state. Accordingly, the amount of time it takes to recover data and restore resiliency of a storage system is also a general consideration to account for in the design and configuration of storage systems.

SUMMARY

N-way parity techniques for virtual disk resiliency are described herein. A virtual disk may be configured across multiple physical storage devices according to configuration parameters that enable user control over storage efficiency and recovery time. To do so, input to set configuration parameters for configuration of the virtual disk is obtained that is indicative of a number of available storage devices and a specified tolerance for storage device failures. Based on this input, a default configuration for the virtual disk may be derived that designates intermediate levels of storage efficiency and recovery time by setting an amount of redundancy data to store with client data between a minimal amount to enable data recovery at the specified tolerance and an amount to duplicate the client data. An option may also be provided to specify a custom configuration that changes the amount of redundancy data to customize the level of storage efficiency and recovery time. The virtual disk is configured and data is stored thereon in accordance with the default configuration or the custom configuration as directed by the user.

Additionally, techniques for recovery and redistribution of data from a virtual disk storage system are described herein. In one or more implementations, a storage scheme derived for a virtual disk configuration is configured to implement various recovery and redistribution techniques designed to improve recovery performance. The storage scheme is configured to employ one or more allocation approaches to produce substantially uniform or nearly uniform distributions of data across physical storage devices associated with the virtual disk. The allocation is designed to facilitate concurrent regeneration and rebalancing operations for recovery of data in the event of failures. Additionally, the storage scheme is configured to implement parallelization techniques to perform the concurrent operations including but not limited to controlling multiple parallel read/writes during recovery.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 4 is a flow diagram depicting another example procedure in which options to specify a custom configuration for a virtual disk are provided in accordance with one or more implementations.

DETAILED DESCRIPTION

Overview

Figure 1:
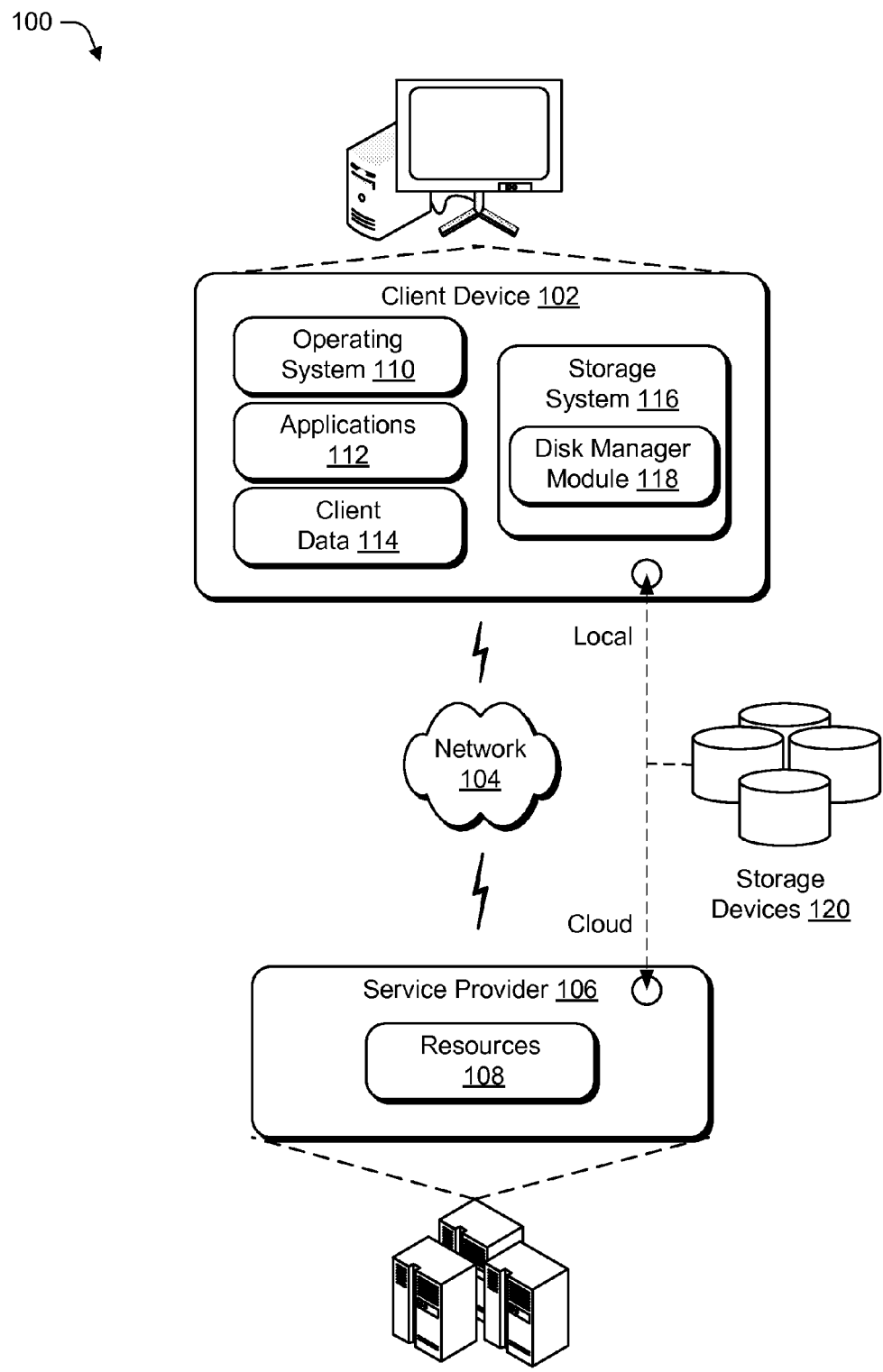
FIG. 1 is an illustration of an environment in accordance with one or more implementations of n-way parity techniques for virtual disk resiliency.

Traditional data resiliency techniques provide limited, fixed options that may not satisfy the demands of some consumers for flexible and scalable virtualized storage that doesn't cost too much and/or is able to recover from failures reasonably fast. Moreover, when devices in a storage system fail, unrecoverable data loss may still occur even for a resilient system if additional failures occur before the storage system is restored to a resilient state. Accordingly, storage system developers and owners may seek to minimize the amount of time it takes to recover data and restore resiliency after a failure.

N-way parity techniques for virtual disk resiliency are described herein, in which a virtual disk may be configured across multiple physical storage devices according to configuration parameters that enable user control over storage efficiency and recovery time. In particular, the term n-way parity as used herein indicates that a configuration parameter defining an amount of redundancy data (e.g., parity bits) to store with client data on a virtual disk is adjustable to customize the configuration. For instance, input to set configuration parameters for configuration of the virtual disk may be obtained that is indicative of a number of available storage devices and a specified tolerance for storage device failures. Based on this input, a default configuration for the virtual disk may be derived that designates intermediate levels of storage efficiency and recovery time. This may be accomplished by setting an amount of redundancy data to store with client data between a minimal amount to enable data recovery at the specified tolerance and an amount to duplicate the client data. An option may also be provided to specify a custom configuration that changes the amount of redundancy data to customize the level of storage efficiency and recovery time. The virtual disk is configured and data is stored thereon in accordance with the default configuration or the custom configuration as directed by the user.

Techniques for recovery and redistribution of data from a virtual disk storage system are also described herein. In one or more implementations, a storage scheme derived for a virtual disk configuration is configured to implement various recovery and redistribution techniques designed to improve recovery performance. For instance, the storage scheme implements one or more allocation techniques to produce substantially uniform or nearly uniform distributions of data across physical storage devices associated with a virtual disk. By way of example, a random scheme, a bucketed scheme and/or a bitmap scheme may be used individually and/or in combination for allocation of client data to storage devices (e.g., layout of the data). The allocation facilitates concurrent regeneration and rebalancing operations for recovery of data in the event of failures. Additionally, the storage scheme is configured to implement parallelization techniques to perform the concurrent operations including but not limited to controlling multiple parallel read/writes during recovery.

In the following discussion, an example operating environment is first described that may employ the techniques described herein. Next, example details and techniques are described which may be implemented in the example environment as well as other environments. Consequently, performance of the techniques is not limited to the example environment and the example environment is not limited to performance of the example techniques. The discussion of example details and techniques includes subsections titled "Virtual Disk Configuration" and "Recovery and Redistribution" that discuss configuration of a virtual disk to store data with customized n-way parity and techniques for recovery of data, respectively. Lastly, example systems and devices are described that may be employed to implement one or more embodiments.

Example Operating Environment

FIG. 1 is an illustration of an environment 100 in an example implementation that is operable to employ techniques described herein. The illustrated environment 100 includes a client device 102 that is communicatively coupled via a network 104 to a service provider 106. The service provider 106 may be configured to make various resources 108 (e.g. content and services) available over the network 104 to the client device 102 and other clients. Generally, resources 108 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources. Content may include various combinations of text, multi-media streams, documents, application files, photos, audio/video files animations, images, web pages, web applications, device applications, content for display by a browser or other client application, and the like.

The client device 102 and service provider 106 may be implemented by one or more computing devices and also may be representative of one or more entities. A computing device may be configured in a variety of ways. For example, a computing device may be configured as a computer that is capable of communicating over the network, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers utilized by the service provider 106.

The client device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The applications 112, for instance, may provide data to the operating system 110 to be rendered and displayed by a display device without understanding how this rendering will be performed.

The client device 102 is also illustrated as including client data 114 and a storage system 116 that may be configured in various ways to store the client data 114 as well as other data. The client data 114 is representative of various types of data typically associated with clients including but not limited to application modules, data files, media files, libraries, and/or other kinds of data.

The storage system 116 represents functionality of the client device 102 for storage of the client data 114. The storage system 116 may implement a particular file system to organize data, expose the data for manipulation by a user, manage files and so forth. As depicted, the storage system 116 may also include or otherwise make of a disk manager module 118 operable to configure and manage the storage system 116. The storage system 116 and/or disk manager module 118 may be combined as illustrated, may be implemented as standalone modules, may represent a component of the operating system 110 or another application, and so forth.

In at least some implementations, the disk manager module 118 is operable to configure the storage system 116 or at least a portion of the storage system as a virtual disk that extends across multiple storage device 120. The storage devices 120 represent various physical storage components including hard disks, media devices, flash storage, optical disks, RAM, ROM, and so forth. Techniques described herein may also be applied to storage enclosure and racks. In accordance with techniques described herein, resources 108 may also include an online storage service (e.g., "cloud-based" storage) configured as a virtual disk that employs n-way parity to selectively control recovery time and/or storage efficiency as described above and below. Thus, the storage device 120 may represent local and/or cloud based storage as depicted in FIG. 1. A virtual disk may be arranged using multiple local and cloud based storage devices. It is contemplated that a virtual disk may be arranged to use a combination of local and cloud-based storage devices in some implementations.

Moreover, the disk manager module 118 further represents functionality to implement n-way parity for the virtual disk and data recovery/redistribution techniques as described herein. By way of introduction, n-way parity as used herein indicates that a redundancy parameter defining an amount of redundancy data (e.g., parity bits) to store with client data 114 on a virtual disk is configurable to customize the virtual disk. A user may make selections through a suitable interface exposed by the disk manager module 118 to set a value for the redundancy parameter. The value set for the redundancy parameter along with other selectable configuration parameters controls how the disk manager module 118 configures the virtual disk and sets-up storage and/or recovery schemes for the virtual disk. Different values of the redundancy parameter correspond to different levels of storage efficiency and recovery time that may be selected as a configuration option.

Thus, the redundancy parameter enables flexibility to define a custom configuration for the virtual disk to attain particular goals for recovery time and/or storage efficiency. In an implementation, a suitable control may be exposed by the disk manager module 118 to collect input indicative of a value to set for the redundancy parameter. In one approach, the redundancy parameter may be set to values in a range that correspond to amounts of redundancy data between a minimal amount to enable data recovery at a specified failure tolerance and an amount to duplicate the client data. Generally, the redundancy parameter is set to an intermediate value that achieves an acceptable balance between storage efficiency and recovery time. Multiple different selectable values for the redundancy parameter may be provided by the system within the intermediate range. However, values may also be set to endpoints in the range of values that correspond to minimal redundancy data/maximum storage efficient at one end and duplication of data one or more times ("e.g., mirroring") at the other end. In this way, a user may be able to select from a continuum of available options to customize the configuration of a virtual disk.

Thus, having considered the foregoing discussion of an example operating environment, consider now details regarding configuration of a virtual disk to store data with customized n-way parity and techniques for recovery of data described in the following sections.

Virtual Disk Configuration

Figure 2:
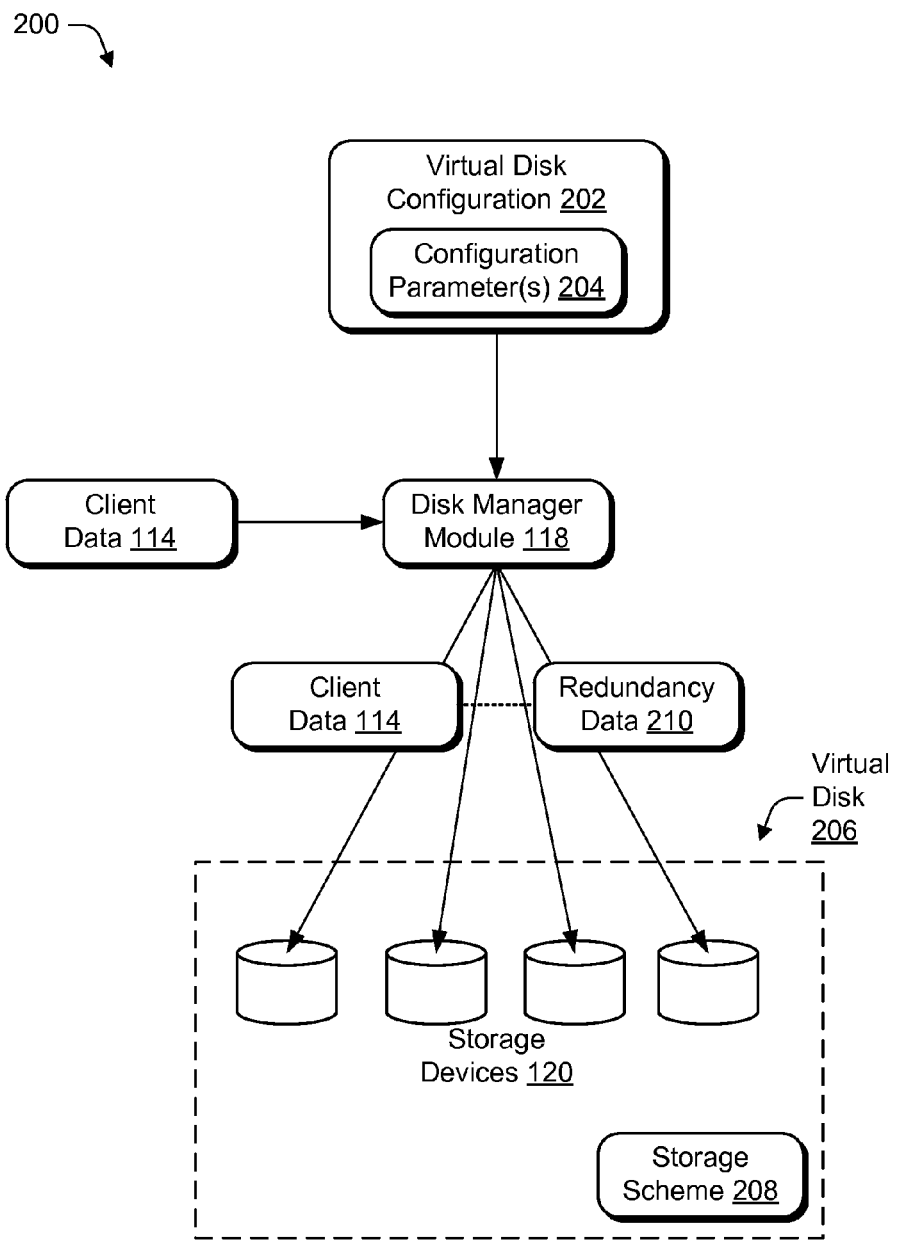
FIG. 2 is an illustration of an example scenario for configuration of a virtual disk in accordance with one or more implementations.
Figure 3:
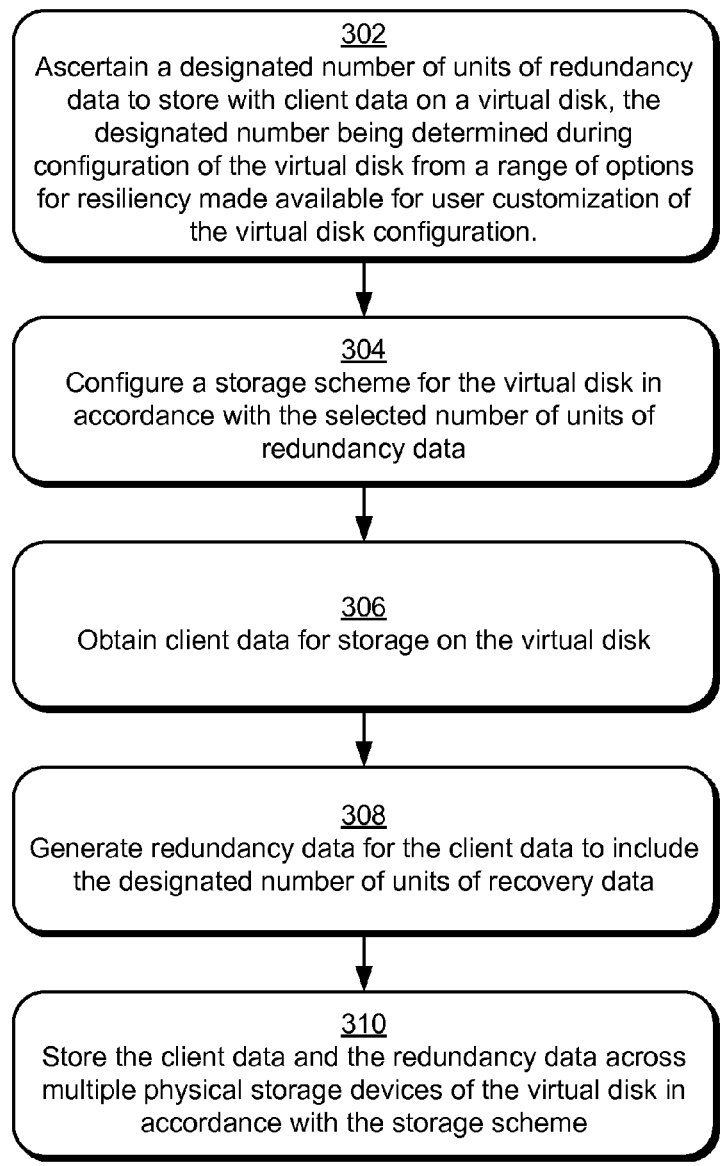
FIG. 3 is a flow diagram depicting an example procedure for configuration of a virtual disk with n-way parity.

This section discusses details of techniques for configuration of a virtual disk to store data with customized n-way parity with reference to an example scenario of FIG. 2 and example procedures of FIG. 3 and FIG. 4. In portions of the following discussion reference may be made to the example operating environment of FIG. 1 in which various aspects may be implemented. Aspects of each of the procedures described below may be implemented in hardware, firmware, or software, or a combination thereof. The procedures are shown as a set of blocks that specify operations performed by one or more devices and are not necessarily limited to the orders shown for performing the operations by the respective blocks. In at least some implementation the procedures may be performed by a suitably configured computing device, such as the example client device 102 of FIG. 1 that includes or makes use of a disk manager module 118 or comparable functionality.

In particular, FIG. 2 is a diagram showing an example scenario for virtual disk configuration with customized n-way parity, generally at 200. As represented in FIG. 2, a virtual disk configuration 202 may be defined through interaction with a disk manager module 118. The virtual disk configuration 202 may include various configuration parameters 204 that may be specified and employed to set-up a virtual disk 206, examples of which are discussed below. The virtual disk 206 may be configured across multiple storage devices 120 to store client data 114. Based on the virtual disk configuration 202, the disk manager module 118 may configure the virtual disk 202 including setting-up a storage scheme 208 for the virtual disk. The disk manager module 118 then enforces the storage scheme 208 to distribute client data 114 across the different storage device in a way that facilities resiliency of the data and recovery in the event of hardware failures. More particularly, the disk manager module 118 in operable to generate redundancy data 210 corresponding to the client data 114 to store along with client data 114. The redundancy data 210 may be configured as checksums, parity bits, or other compressed versions of the client data 114 sufficient to enable reconstruction of the client data 114 even if some of the data is lost due to hardware failures. If a mirroring scheme is employed, the redundancy data 210 may include one or more copies of the client data. The amount and/or type of redundancy data to generate and store may depend upon a value set for a redundancy parameter as mentioned previously. Accordingly, the storage scheme 208 reflects the selected value of the redundancy parameter as well as other configuration parameters 204. The system is therefore user configurable to set-up a virtual disk with particular recovery time and storage efficiency properties.

Generally speaking, the disk manager module 118 and storage scheme 208 are designed to implement a scalable, efficient virtual storage system which provides the user with control over configuration of the storage. The user is able to select from multiple configuration options that can be represented in a range or on scale from a maximally efficient scenario to a scenario in which data/drives are mirrored one or more times. As discrete options are selected moving from the maximally efficient scenario to mirrored scenarios, storage efficiency decreases (e.g., more storage space is consumed) and recovery performance increases (e.g., recovery time is reduced). The system therefore enables tradeoffs to be made by users on an individual basis between storage efficiency and recovery performance by providing a plurality of selectable options in the range and/or on the scale.

The redundancy data 210 may be computed algorithmically using parity algorithm techniques. Reed-Solomon is a parity algorithm that uses erasure code techniques known to those of skill in the art. Reed-Solomon derives redundancy data from coefficients of a polynomial generated by multiplying the data with a generator polynomial. In an implementation, Reed-Solomon represents a maximally efficient scenario for storage of m units of data with n units of redundancy data (e.g., total units stored k=m+n). In particular, given a number of units of client data to store m and a failure tolerance t, Reed-Solomon generates and stores t units of redundancy data with the m units of client data. Reed-Solomon provides the minimum amount of redundancy data (e.g., k=m+n with n=t) that can be used to enable recovery of the data in the event that t failures occur (e.g., t units of data are missing and/or t storage devices fail). In the case of failure, values that remain available may be plugged back into the polynomial expression/algorithm to solve for missing values and accordingly reconstruct missing data. In this example, m units are read back in for operations in the reconstruction process, which produces relatively high recovery times. A representative Reed-Solomon example for five data units and a failure tolerance of two is as follows:

Store five data units $D_x$ with two units of redundancy data $P_x$ (e.g., parity data or checksums):
$D_0 \, D_1 \, D_2 \, D_3 \, D_4 \, D_5 \, P_0 \, P_1$
where the polynomials for the redundancy data $P_0$ and $P_1$ are expressed as:

$$P_0 = D_0(+)D_1(+)D_2(+)D_3(+)D_4(+)D_5$$

$$P_1 = g^0 D_0 (+) g^1 D_1 (+) g^2 D_2 (+) g^3 D_3 (+) g^4 D_4 (+) g_5 D_5$$

with the $g^x$ values being configurable coefficients for the polynomials.

Mirroring as mentioned involves making one or more copies of client data. The data on a particular device is duplicated on at least one other device, so recovery merely involves switching to the duplicated data on the other device. While mirroring may give maximum recovery performance, the storage cost is high since multiple full copies of data are maintained. In the example of five data units with a tolerance of two failures, mirroring would store two additional copies of the data or fifteen total data units.

Accordingly, the disk manager module 118 and storage scheme 208 as discussed herein are configured to provide multiple additional options in addition to or as alternatives to Reed-Solomon and Mirroring. To do so, the system is configured to support an n-way parity model that make a plurality of additional configuration options available to users. Broadly speaking, the n-way parity model enables users to choose an amount of redundancy data that fits individual systems and constraints. Given m units of data to store and a failure tolerance t, n-way parity stores a total of k units of data (e.g., n units of redundancy data with m units of client data), where k is greater than m+t (e.g., k=m+n, where t<n<m×t). The value of n corresponds to the redundancy parameter discussed herein that is configurable during set-up and configuration of a storage system. In other words, additional redundancy data is stored (as defined by a value set for n) above the maximally efficient scenario in which t units of redundancy data are stored. This may decrease recovery time to reconstruct data by enabling the use of polynomials expressions that are designed to use fewer coefficients for reconstruction. Thus, the overhead of data reads for reconstruction can be reduced. Various techniques and algorithms may be used to implement the n-way parity model.

In an implementation, the n-way parity model is based at least in part upon local reconstruction codes (LRC) known to those of skill in the art. LRC is another parity algorithm that reduces the subset of data to read when recovering symbols by using additional redundancy data, as indicated. LRC therefore generates and uses more redundancy data than Reed-Solomon at a given failure tolerance, but may produce faster recovery times. A representative LRC example for five data units and a failure tolerance of two for comparison to the foregoing examples is as follows:

Store five data units $D_x$ with three units of redundancy data $P_x$ (e.g., parity data or checksums):
$D_0 \, D_1 \, D_2 \, D_3 \, D_4 \, D_5 \, P_0 \, P_1 \, P_2$
where the polynomials for the redundancy data are expressed as:

$$P_0 = D_0(+)D_1(+)D_2$$

$$P_1 = D_3(+)D_4(+)D_5$$

$$P_2 = g^0 D_0 (+) g^1 D_1 (+) g^2 D_2 (+) g^3 D_3 (+) g^4 D_4 (+) g^5 D_5$$

with the $g^x$ values being selected coefficients for the polynomials.

Notably, the n-way parity model implemented by the disk manager module 118 may be configured as a combined solution that provides user selection and customization of virtual disk configuration parameters for a range of options. For instance, the n-way parity model may make use of one or more of Reed-Solomon, LRC, and/or mirroring techniques to provide the range of options from which a user is permitted to select when configuring a virtual disk. Different schemes may be used at different points on a scale of available options. For example, a scale of options offered by the system may employ Reed-Solomon techniques at one endpoint, LRC techniques at intermediate points, and mirroring on the other end. This approach provides users with a wide range of options and a great deal of flexibility to customize the storage scheme for their storage systems.

Further, the particular scheme used for a given point may be optimized for the scenario. As an example, the coefficient values $g^x$ are typically selected carefully and are not repeated to facilitate convergence to a solution when reconstructing data. In traditional fixed solutions this may make sense as there may be just one option provided to the user and the developer can make predetermined coefficient choices for the single option. However, with a range of options as described herein the possibility of selecting coefficients individually for different options is open. In one approach, repeating coefficients are allowed for one or more levels of failure tolerance, generally at lower values of failure tolerance. For instance, when the failure tolerance is equal to two the constraint on repeating coefficients may be relaxed as the computations may be relatively less complex. Allowing coefficients to repeat for at least some failure tolerance values enables lower coefficients that can be expressed using a reduce number of bits, which simplifies the overall computation.

Moreover, the user has control over intermediate options by being able to select a particular level of redundancy. Here, the configurable redundancy parameter may be used to select the particular amount of redundancy data (e.g., the value of n) to generate and store so as to achieve a user-selected balance between storage efficiency and recovery time. The system is designed to support scalable selection of the redundancy parameter n to achieve n-way parity at different failure tolerance levels assuming sufficient storage devices are available to implement the selected configuration. Additional details regarding these and other aspects of n-way parity techniques are discussed in relation to the following example procedures.

FIG. 3 depicts a procedure 300 in an example implementation for configuration of a virtual disk with n-way parity. A designated number of units of redundancy data to store with client data on a virtual disk is ascertained, the designated number being determined during configuration of the virtual disk from a range of options for resiliency made available for user customization of the virtual disk configuration (block 302). For example, a user may interact with the disk manager module 118 to set-up and configure a virtual disk. The interaction may occur by way of various user interfaces and/or configuration dialogs that are output for display by the disk manager module 118 during a configuration sequence. As part of the configuration sequence, the user may supply input to specify a number of physical devices and/or an amount of storage to use for the virtual disk (e.g., storage space for data). The user may also specify a failure tolerance. The system then generates various available resiliency options for the particular arrangement at the specified failure tolerance. The options enable selection of a redundancy parameter from a range of options for resiliency made available for user customization of the virtual disk configuration. The redundancy parameter reflects a designated number of units of redundancy data to store with client data that determined as a configuration option.

The options for the particular arrangement may include a default configuration as previously noted that selects intermediate levels of storage efficiency and recovery time. This may occur by setting an amount of redundancy data to store with client data between a minimal amount to enable data recovery at the specified tolerance and an amount to duplicate the client data. In other words, a default value of the redundancy parameter n may be set to an intermediate value in the range of available options.

Additionally, configuration dialogs presented during the configuration sequence may include controls or other instrumentalities operable to select a custom configuration. For example, a slider control may be provided to enable user selection of the value for the redundancy parameter (e.g., n). The slider control may be provided in conjunction with a scale configured to visually represent the range of available options and/or corresponding performance tradeoffs. Other suitable instrumentalities such as menu items, input fields, drop down boxes, radio controls, and so forth may be configured to provide comparable functionality to select values for the redundancy parameter or otherwise choose from a range of available options for virtual disk configuration. In response to changes in the value of redundancy parameter, a representation of corresponding tradeoffs between storage efficiency and recovery time may be presented via the configuration dialogs/interface. In this way, a user is able to explore different options and see how selected options affect performance.

A user may then make a selection to keep the default configuration or to pick another custom configuration from the options. In the event that a user does not choose to customize the failure tolerance or the redundancy parameter, then the default configuration may automatically be selected and applied. Otherwise the user customizations that are selected via the dialogs/interface are applied to configure the virtual disk.

Accordingly, the designated number may be determined as a user-selected value or as a default value. The user may be further prompted to designate a sufficient number of physical devices to use for the configuration and/or to add physical devices if available devices are insufficient for the selected set-up. This may involve adding local devices and/or purchasing or otherwise authorizing additional cloud-based storage capacity through a suitable provider.

A storage scheme is configured for the virtual disk in accordance with the specified number of additional units of redundancy data (block 304). Client data is obtained for storage on the virtual disk (block 306) and redundancy data for the client data is generated to include the designated number of recovery data (block 308). The client data and the redundancy data are stored across multiple physical storage devices of the virtual disk in accordance with the storage scheme (block 310).

In particular, based at least in part upon the configuration parameters that are selected by the user or otherwise designated, the disk manager module 118 configures a storage scheme for the virtual disk. The storage scheme reflects the redundancy parameter as well as other configuration parameters. By way of example, consider a scenario in which a storage system is configured so as to store five units of data with three units of redundancy data with a failure tolerance set at a tolerance of two simultaneous failures. In other words, $m=5$, $n=3$, $t=2$ and $k=8$. The storage scheme is configured to generate redundancy data for client data and distribute the eight units of total data across physical devices accordingly.

The physical arrangement of the storage system also reflects the storage scheme, such that eight physical storage devices (or defined failure units) are associated with the virtual drive. Generally, the physical storage devices are individual drives that represent units of hardware failure. The unit of hardware failure may be designated at different levels such as a disk level, enclosure level, rack level, room level, location level and so forth. The storage scheme is designed to distribute data in a prescribed manner across the defined failure units to achieve resiliency.

The storage scheme therefore controls generation of redundancy data and distribution of the data in accordance with the configuration parameters. To do so, data may be broken into slabs of a defined size (e.g., 500 megabyte, 1 gigabyte, etc.) and each slab is handled by generating appropriate redundancy data. In this example, the redundancy data is generated using three units for every five units of client data. Each slab with the corresponding redundancy data is distributed across the physical storage devices.

The distribution may occur in various ways. For example, a simple approach involves designating m devices for storage of client data and n devices to store the redundancy data in an arrangement where the total data to store is defined as $k=m+n$. Thus, five devices may be dedicated to storage and threes device for redundancy data in the foregoing example. The data may be written sequentially to each device.

In a more sophisticated approach, the storage scheme may be configured to implement a rotation sequence for data distribution to obtain a substantially equal distribution of client data and redundancy data across the physical storage devices. This may facilitate recovery and redistribution techniques as discussed in more detail in the following section. For instance, given an arrangement with eight total storage devices, client data storage consumption of five device, and a redundancy parameter set to three (e.g., $k=m+n$ with $k=8$, $m=5$, $n=3$) the rotation sequence in a first pass may write client data to devices 1, 2, 3, 4, 5 and redundancy data to devices 6, 7, 8. In a second pass, the writes for client data and redundancy data are rotated among the devices. For example, devices 6, 7, 8, 1, 2 may be employed for client data and devices 3, 4, 5 for redundancy data in a second pass. Here, a rotation pattern is employed in which the starting drive for each pass shifts up five places in a logical ordering of the devices and the writes wraps around. In general, any suitable rotation pattern for a group of storage devices may be employed to distribute client data and redundancy data equally across the group of storage devices. By way of example, the pattern may be implemented to shift one place for each pass, alternate front to back in the logical order, employ an even/odd device sequence for writes, and so forth.

The rotation sequence is continued in accordance with a particular pattern for each group of writes to distribute the data equally.

FIG. 4 depicts a procedure 400 in an example implementation in which options to specify a custom configuration for a virtual disk are provided. Options for configuration of a virtual disk across multiple physical storage devices are exposed that are selectable to control an amount of redundancy data to store for resiliency of user data stored on the virtual drive (block 402). For example, a redundancy parameter may be set as a configuration option to specify an amount of redundancy data to store with client data as previously described. The system is designed to support scalable selection of the redundancy parameter (e.g., n) to achieve n-way parity at different failure tolerance levels. Generally, options for configuration of the virtual disk provide a range of potential values selectable for the redundancy parameter and a user is able to select from any of the available options. In one approach, the range of potential redundancy parameter values for n-way parity is exposed in a configuration dialog or other suitable interface that facilitates user setting of the redundancy parameter as well as other configuration parameters such as the failure tolerance and physical device allocation.

The virtual disk is configured for storage of the user data along with redundancy data across the multiple physical storage devices in accordance with the amount of redundancy data to store for resiliency that is selected via the option (block 404). For example, the virtual disk may be configured to include a number of physical storage devices that corresponds to a storage scheme derived based on the configuration parameters specified by the user and/or default settings. The storage scheme is enforced to control the manner in which client data and corresponding redundancy data are written to and stored by the virtual disk.

Given a specified amount of storage space (e.g., a number of available storage devices) and a failure tolerance, the system may automatically generate the range of options available for selection by the user and expose these options via a suitable interface. The system may also set a default configuration to use in the event a user chooses not to exercise any of the other options to customize the set-up. As mentioned, the default configuration is defined at an intermediate level so as to create an acceptable balance between storage efficiency and recovery time. The default configuration may be defined based upon a designated threshold goal for either or both of recovery time or storage efficiency.

In an implementation, the system may be designed to enable selection from the full range of options that are possible given the specified configuration parameters (e.g., amount of storage and a failure tolerance). Alternatively, the system may be configured to scope down the range of possible options to a subset of available options that are exposed for user selection. In other words, some possible options may be excluded in some scenarios. This approach may be employed to produce a system for which some performance guarantees for data protection, resiliency, and/or recovery may be made. By way of example, Reed-Solomon options and/or mirroring options may be excluded in one or more implementations. A minimum number of physical storage devices may also be specified, which may also reduce the range of options.

In another example, a lower bound may be placed upon values that may be selected for the failure tolerance in relation to the number of physical storage devices. This forces the failure tolerance to increase to at least a threshold level as more and more physical storage devices are added. The probability of having an arbitrary number of simultaneous device failures increases as the number of devices increases. Having a lower bound adds some measure of protection against a failure of more devices than the failure tolerance for the system, which could result in unrecoverable data loss.

In an implementation, a lower bound (e.g., minimum value) for the failure tolerance is set that increases at device number thresholds or increments. Thus, the lower bound ensures that the failure tolerance is set to at least the lower bound at the device number thresholds. The lower bound may be set to increase linearly or according to a non-linear function based on the probability of failures for systems of different size. In one particular example, the lower bound may be configured to increase by one at a specified increment for number of devices. If the increment is set to 7 for instance, then the lower bound may be set to 1 for 1 to 7 devices, 2 for 8 to 14 devices, 3 for 15 to 21 devices, and so forth. Naturally, the increment and/or the size of increase in the lower bound may be set to different values. Moreover, the increment and/or the size of increase in the lower bound employed may remain constant or may vary as the number of devices increases.

Having considered the above discussion of details regarding configuration of a virtual disk with n-way parity, consider now some details of techniques for recovery and redistribution of data in the event of failures.

Recovery and Redistribution

This section describes techniques for recovery and redistribution of data to regain resiliency after a failure. The techniques may be applicable to systems configured with n-way parity as discussed herein as well as to other virtualized storage systems that make used of multiple physical devices, such as mirrored systems.

To reiterate, data stored on storage media is considered resilient when one or more storage devices can fail and the data is not lost (e.g., data is recoverable). A variety of techniques are available that can be employed to provide resiliency against failures including the n-way parity discussed in the preceding section. In the event of a failure, data loss may still occur even for a resilient system if additional failures occur before the storage system is restored to a resilient state. Accordingly, the amount of time it takes to recover data and restore resiliency of a storage system is a consideration to account for in the design of storage systems.

In one or more implementations, the storage scheme 208 derived by a disk manager module 118 for a virtual disk configuration is configured to implement recovery and redistribution techniques described herein. As discussed in greater detail below, the recovery and redistribution techniques are designed to reduce the time it takes to restore resiliency after failure. Broadly speaking, this involves (1) techniques for distribution of data across multiple physical drives in a manner that facilitates concurrent regeneration and rebalancing operations for recovery and (2) parallelization techniques to perform the concurrent operations including but not limited to controlling multiple parallel read/writes during recovery.

Figure 5:
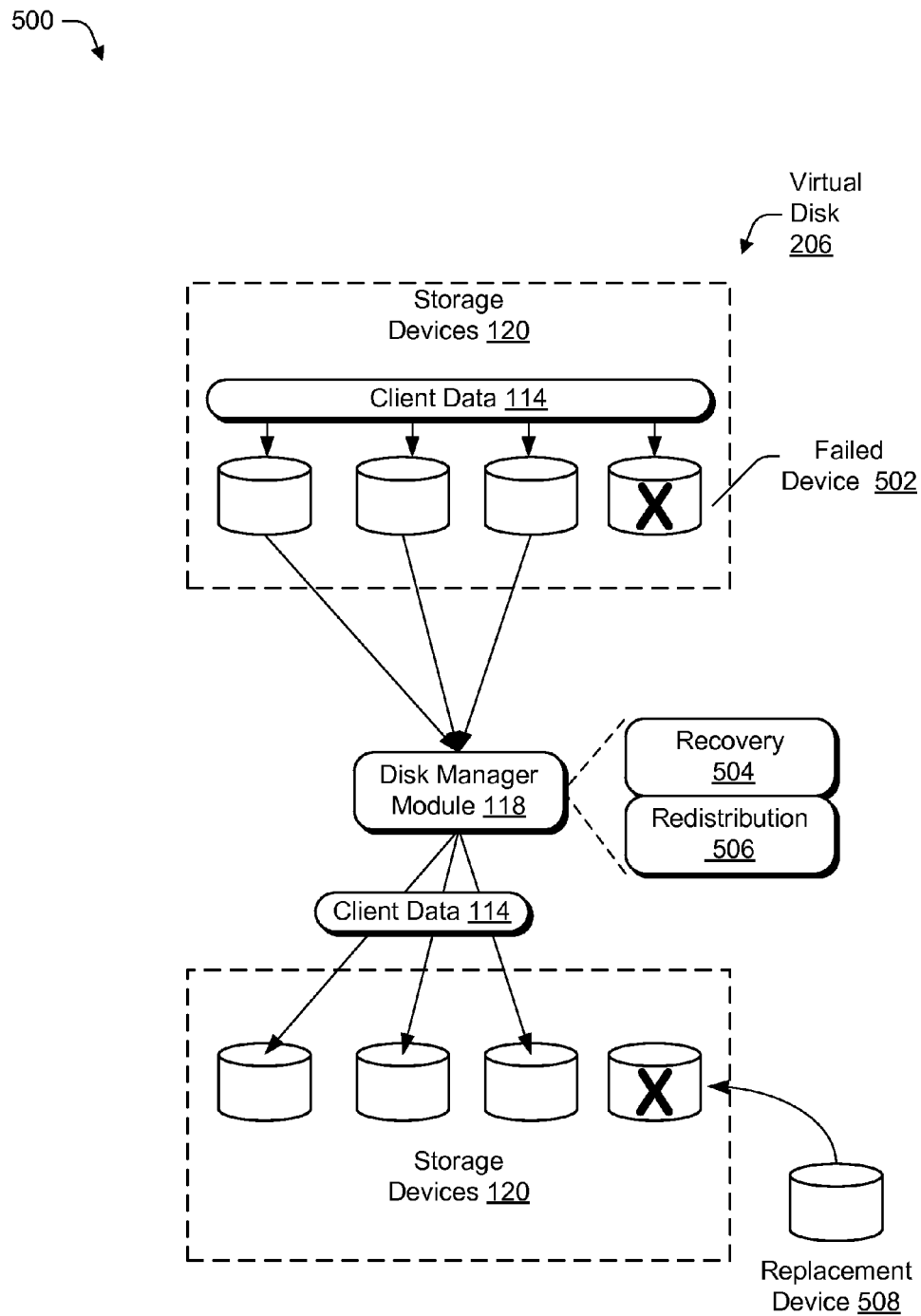
FIG. 5 is an illustration of an example scenario for recovery of data following failure of one or more devices associated with a virtual disk in accordance with one or more implementations.

To illustrate, consider FIG. 5 which depicts generally at 500 an example scenario for recovery of data following failure of one or more devices associated with a virtual disk. Here, assume the example virtual disk 206 is initially in a resilient state. The resiliency may be achieved using n-way parity described herein or other techniques. As depicted, client data 114 (and corresponding redundancy data) is distributed across various storage devices 120. The disk manager module 118 is depicted as including or otherwise making use of functionality for recovery 504 and redistribution 508. The functionality for recovery 504 and redistribution 508 may be implemented by way of a storage scheme 208, sub-modules of the disk manager module 118, stand-alone modules, or otherwise.

Accordingly, when a failed device 502 is encountered, the disk manager module 118 may operate to recover data that was stored on the failed device 502. This may include identifying copies of lost data and/or applying an erasure code or other regeneration algorithm to regenerate the lost data. Additionally, the disk manager module 118 is operable to redistribute 506 the data across the remaining devices. By way of example, the data initially stored across four devices in FIG. 5 may be rebalanced across three devices, if enough reserved storage space is available on them, when the failed device 502 is detected. The client data may now be resilient, but the virtual disk is down one device and therefore may not be in a performant state. As further illustrated, a replacement device 508 may be added to the virtual disk 206 to replace the failed device 502. In this scenario, the disk manager module 118 is further operable to again redistribute the data back across the multiple drives. In the illustrated example, the data is rebalanced from the three devices to add back the replacement device 508 and reestablish performance. The various recovery operations just described are configured to use data allocation and parallelization of tasks as described herein to minimize the time from failure to restoration of resiliency.

Allocation Schemes

As mentioned, the manner in which data is allocated or laid out on the virtual drive determines the extent to which parallelization of tasks can be employed for recovery operations. Accordingly, the disk manager module 118 may be configured to employ an allocation scheme that facilitates parallel recovery. In other words, the allocation scheme is designed to enable parallelization described herein by selectively laying out data across physical storage devices.

Generally, suitable allocation schemes operate to produce a substantially equal distribution of data across available storage. To do so, data may be broken up into units referred to as slabs. For example, a one terabyte storage device may be divided into one gigabyte slabs. The allocation scheme is designed to allocate the slabs across different combinations of available storage devices for the virtual disk. Accordingly, the slabs are distributed so as to ensure that the data is located across the available storage devices. This enables parallelization of writes/reads during regeneration operations by spreading the redundancy data out to more physical devices. Various suitable allocation schemes are contemplated. By way of example and not limitation, some illustrative allocation schemes including random, bucketed, and bitmap schemes are discussed in turn just below.

One approach involves randomly selecting the storage devices to use for each slab. In an implementation, a random number generator may be employed to select the devices to use for allocations. Other ways of randomly selecting devices may also be employed. Slabs are then individually distributed across the randomly selected devices. The random scheme is fairly straightforward to implement and provides at least an adequate level of distribution.

A bucketed scheme is also contemplated. The bucketed scheme is an optimization of the random scheme in which storage devices are divided into a designated number of buckets according to capacity utilization. The number of buckets may be a fixed value, such as 10, or may be based upon the total number of devices (e.g., a percentage of the total number of drives). For example, buckets may be configured in 10% utilization increments. A bucket associated with the lowest capacity utilization is employed first for allocation. Further, the buckets are processed in turn from lowest to highest capacity utilization to produce a distributed allocation of data on the virtual disk. Within each bucket, devices may be selected randomly. As data is added to devices, capacity utilization increases and the devices move into different buckets associated with higher capacity utilization. The lowest capacity bucket eventually becomes empty and accordingly the bucket associated with the next lowest capacity utilization is selected for the next slab allocation. The process is repeated to cycle through the various buckets. The bucketed approach may provide a relatively more uniform distribution than using the random approach alone.

Additionally, a bitmap scheme may be employed in some implementations. In the bitmap approach, each device in the pool is configured to maintain a bitmap that represents its relations with each other devices. Two devices are considered to be in a relation, if they are used as part of the same slab allocation. For example, copies of data or data/redundancy data combinations for the same slab are maintained on the drives having a relation. A relation may be reflected by setting a corresponding bit in the bitmap to a value of 1 to indicate the relation and 0 otherwise. A round-robin list of drives is maintained. When data for a slab of data is allocated, each device is checked in the round-robin order to determine suitability for the allocation.

When a device is checked for suitability, the bitmap is referenced to determine relations with respect to the current operation based on the device's bitmap. If the bitmap indicates that a relation already exists with respect to the operation, the device is skipped. In this way, allocations that produce new relations between devices are prioritized. If each device is checked and none of the devices can be selected for the particular operation, then the first drive in round-robin order is selected, regardless of the bitmap. Once all devices have been picked in turn, the respective bitmaps are updated to reflect the new allocation and relations. When a device's bitmap becomes all 1 s, the bitmap may be reset to 0s so that additional relations may be formed in subsequent operations. This approach effectively produces an allocation with an even distribution of relations between the pool of devices and slabs by using the bitmaps to prioritize and select devices combinations that have not been established for allocation of each particular slab or portion of data to relocate.

The random, bucketed, and bitmap schemes as well as other schemes may be employed individually or in combination with each other in various implementations. For example, the bucketed scheme may be employed for initial data distributions and in some rebalancing scenarios. When a new replacement drive is added, though, the bucket approach may not be appropriate since the new drive has considerably less capacity utilization than the other drives. Thus, the random scheme or a direct scheme may be used first to initially fill the new replacement device to a designated capacity. A rebalance using the bucketed or bitmap approach may then be performed shortly thereafter to redistribute the data in a manner that is more suitable for parallelization. Thus, the allocation scheme may represent a combination of multiple individual schemes that are applied selectively to different allocation operations. The combination of individual schemes may include but is not limited to the example random, bucketed, and bitmap schemes described herein. Further details regarding these and other aspects of recovery and redistribution techniques are described in relation to the following example procedure.

Figure 6:
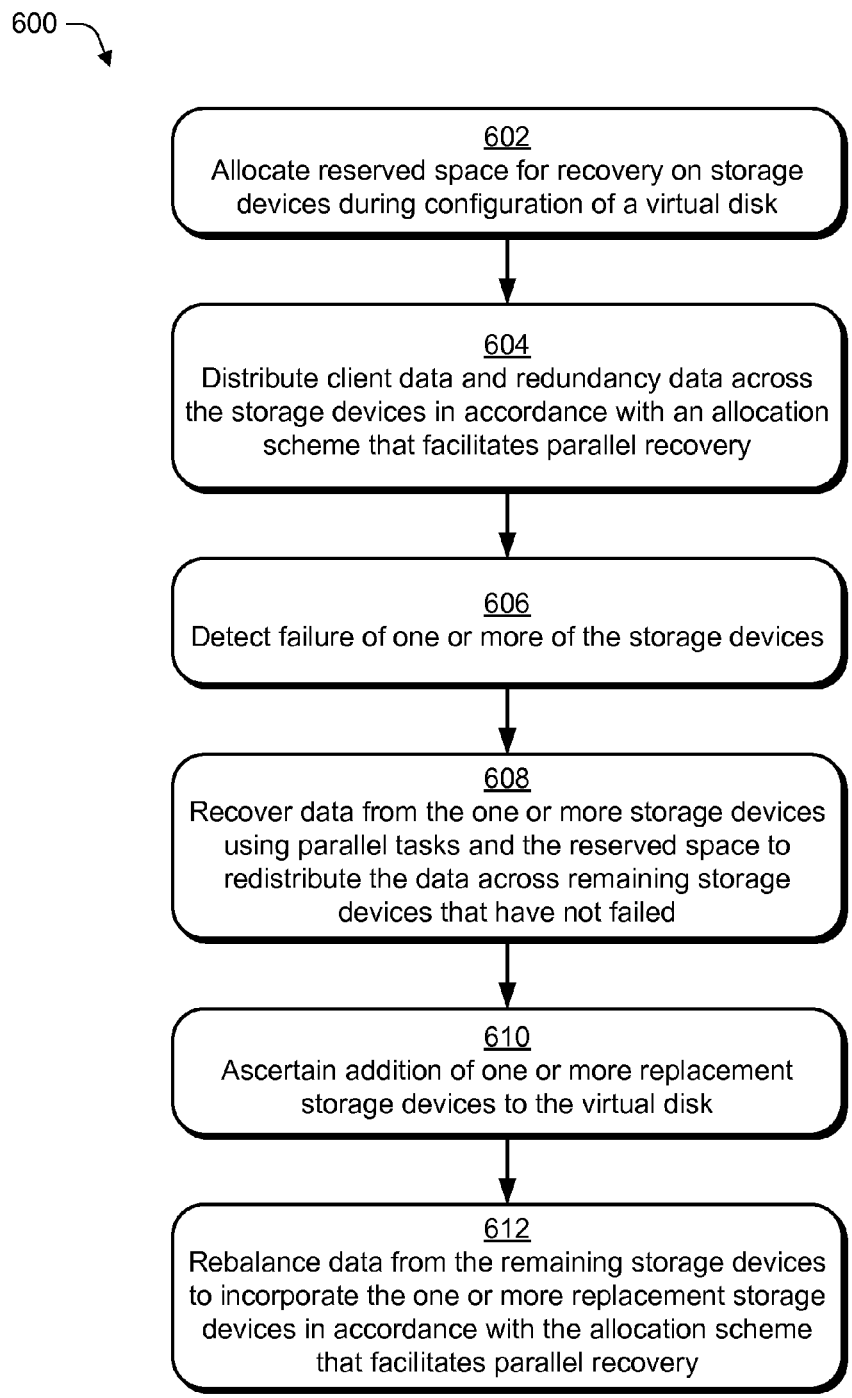
FIG. 6 is a flow diagram depicting an example procedure for recovery and redistribution of data in accordance with one or more implementations.

FIG. 6 depicts an example procedure 600 for recovery in accordance with one or more implementations. Reserved space is allocated for recovery on storage devices during configuration of a virtual disk (block 602). For example, the disk manager module 118 may be configured to reserve at least some storage space to enable recovery and redistribution techniques described herein. Parallelization may be adversely affected if devices are utilized to capacity since these drives will be unavailable for writes during recovery. Accordingly, the disk manager module 118 may implement a storage scheme that reserves some space on each storage device. The amount of space may be a pre-defined amount such as 25% or 30% reserved space. The amount of space may also be computed according to the particular virtual disk configuration.

In an implementation, the reserved space may be computed as a factor of the failure tolerance so that sufficient space across the remaining devices is available for reconstruction in the case the number of tolerable failures occurs. For example, given 10 devices with a failure tolerance of 2 devices and individual capacities of 1 terabyte, reserved space may be selected so that at least 2 terabytes (e.g., the capacity of tolerable failures) of reserved space is available on the 8 devices that would remain after 2 failures. Thus, each drive would reserve at least 250 gigabytes of space (e.g., 2000 gigabytes/8 devices) or 25% in this example. There is a built in safety factor in this computation since the failed drives also have some reserved space and therefore the computed reserved space should be more than adequate for recovery. Naturally, the amount of reserved space may be computed in any suitable way including but not limited to the enumerated examples.

Client data and redundancy data are distributed across the storage devices in accordance with an allocation scheme that facilitates parallel recovery (block 604). Various allocation schemes may be employed including the examples discussed previously. Moreover, redundancy data may be computed using n-way parity, mirroring, Reed-Solomon or a combination thereof. Slabs of data may then be allocated in a manner that achieves an adequate distribution across the drives that is sufficient to enable parallel recovery. Accordingly, parallelization techniques described above and below may be employed for any or all of initial distribution of data to the storage devices (e.g., writes of data slabs to the devices), recovery operations (reads/writes), rebalancing, and so forth.

Failure of one or more of the storage devices is detected (block 606). For example, the disk manager module 118 may operate to monitor storage device performance and determine when devices stop working properly. If errors are encountered for a device, the device may also be shut down to prevent an unrecoverable failure.

Data is recovered from the one or more storage devices using parallel tasks and the reserved space to redistribute the data across remaining storage devices that have not failed (block 608). Here, data that is stored on the failed drive may be relocated to the remaining disks. This relocation is possible in part because of the reserved space that is allocated on each disk. It is also possible to relocate data without explicitly reserving space so long as sufficient space is available on the remaining disks. Reserving space will ensure that this is the case. The disk manager module 118 may operate to locate counterpart data to data on the failed device (e.g., copies, redundancy data, and/or parity data). The disk manager module 118 may reconstruct lost data using the counterpart data and may determine source and destination location for each portion of data (e.g., chunk or slab) to be relocated/redistributed. Additionally, the redistribution of the data may be configured to use parallelization techniques that are described in greater detail below.

Addition of one or more replacement storage devices to the virtual disk is ascertained (block 610). Data is rebalanced from the remaining storage devices to incorporate the one or more replacement storage devices in accordance with the allocation scheme that facilitates parallel recovery (block 612). For example, when replacement storage devices are added to the virtual drive, the disk manager module 118 detects this and may take appropriate action to make use of the added storage. Generally, this involves an allocation operation to layout data on the replacement devices. Further, the disk manager module 118 may operate to rebalance data over all the devices of the virtual disk including the storage devices that remain after the failure plus the replacement drives. In other words, the data is spread back out to the pool of devices which may restore performance and reestablish the reserved space. Moreover, the rebalance may occur in accordance with the allocation scheme so the data is prepared for parallelization in connection with subsequent recovery and/or redistribution operations.

In an implementation, the bucketed scheme may be defined as a default that is used for distribution so long as capacity utilization of the devices is appropriate. Generally, the bucketed scheme provides good distributions when the difference between capacity utilization is not too large across the pool of devices. As mentioned, when just one or two devices have much lower utilization than the rest of the pool the bucketed scheme may over select these devices and therefore make parallelization more difficult. Accordingly, when replacement devices are added, the random approach or another approach may be employed first to load some data on the replacement devices. The bucketed scheme may be applied thereafter to rebalance the data across all of the available devices to achieve a better distribution and prepare the storage system for parallelization.

Parallelization

Parallelization refers to techniques to perform concurrent operations for recovery and redistribution. This may include but is not limited to controlling multiple parallel read/writes for data allocation, recovery, rebalancing, and so forth. The parallelization is designed to involve as many devices and combinations of devices as possible during recovery processes so as to increase the speed of recovery (e.g., minimize recovery time).

Broadly speaking, parallelization involves producing matches between sources and destination for data chunks so as to enable as many concurrent tasks to occur as possible. For example, if a pool has one hundred storage devices, then fifty read/write tasks might conceptually be performed in parallel between fifty pairs established between the devices for a processing pass. To be effective, parallelization relies upon a sufficient allocation of the data across the physical drives using allocation schemes as described in the preceding section. Given an adequate distribution, parallelization determines the device pairings, identifies tasks that may be completed in parallel, and then schedules and executes the tasks to minimize recovery time. Further details regarding these and other aspects of parallelization techniques are described in relation to the following example procedure.

Figure 7:
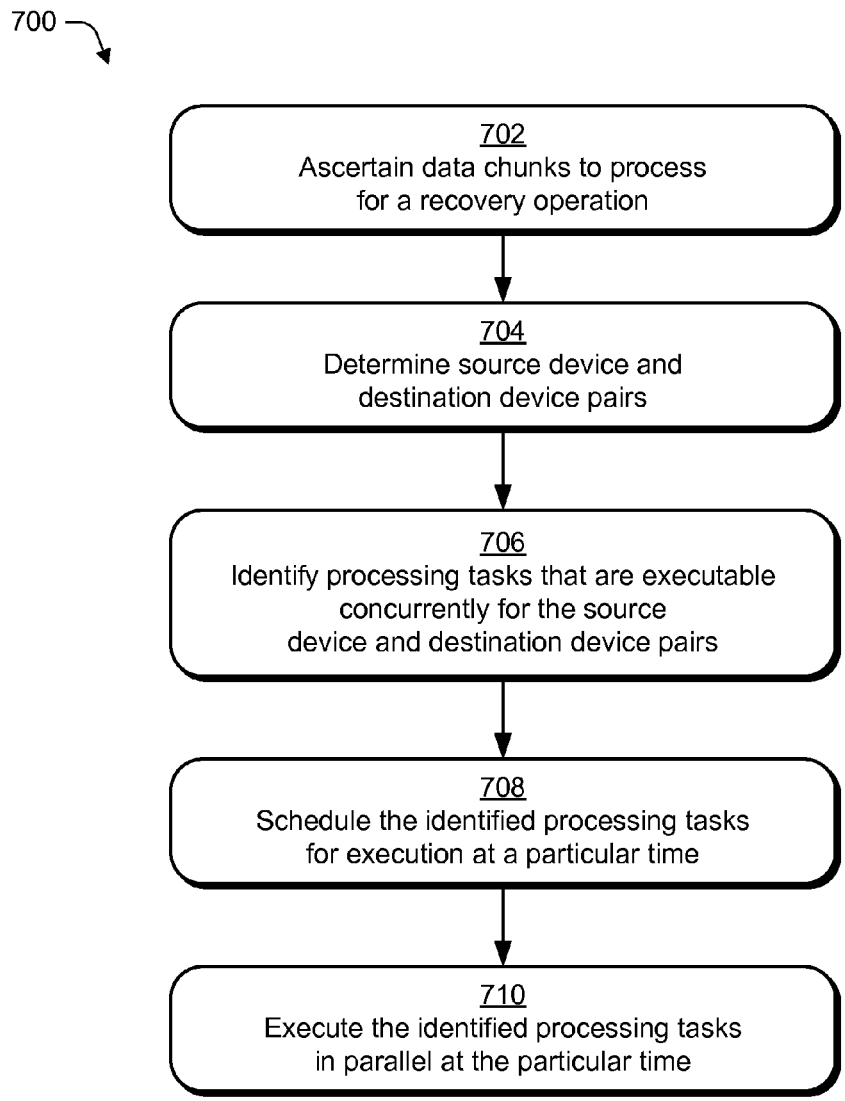
FIG. 7 is a flow diagram depicting an example procedure for parallelization in accordance with one or more implementations.

FIG. 7 depicts an example procedure 700 for parallelization in accordance with one or more implementations. Data chunks to process for a recovery operation are ascertained (block 702). Consider again a scenario in which a storage device fails and accordingly some data contained on the failed device is no longer available from the device. Assuming the system was in a resilient state when the device failed, counterpart data for the "lost" data is available on the remaining drives. The counterpart data may define the source devices and locations of data for the recovery operation. The disk manager module 118 may be configured to determine locations of this counterpart data. Lost data may also be regenerated from redundancy data if parity based resiliency is employed in addition to or in lieu of mirroring. Naturally, parallelization may also be used for rebalancing/redistribution operations in which case locations of data to relocate via the operations define the source devices and locations. The source data may be organized in chunks or slabs of a selected size, such as one gigabyte or five-hundred megabyte slabs. The parallelization may therefore be performed on a slab-by-slab basis.

Having ascertained the source data, the disk manager module 118 may also make a determination as to whether parallelization is possible for the particular operation. To do so, the disk manager module 118 may examine the data layout and locations to assess the distribution. The disk manager module 118 may also check to ensure that sufficient reserved space or other available space exists on destination devices. In other words, the disk manager module 118 establishes that sources and destinations are sufficiently distributed to support parallelization. If not, then parallel processing may be skipped and other techniques for the recovery may be selected. Assuming that a sufficient distribution is discovered, the disk manager module 118 continues by configuring the parallel processing to occur to implement the recovery operation.

In particular, source device and destination device pairs are determined (block 704). Then, processing tasks that are executable concurrently are identified for the source device and destination device pairs (block 706). The identified processing tasks are scheduled for execution at a particular time (block 708) and then, the identified processing tasks are executed in parallel at the particular time (block 710).

The parallel processing may be implemented in any suitable way. In one approach, the data set to be redistributed/relocated is broken into slabs of a designated size as mentioned above. The slabs are then processed one-by-one to determine a source device and a destination device combination for the slab. In other words, the disk manager module 118 matches source data to destinations to generate source device and destination device pairs. The source device and destination device pairs correspond to processing tasks (read/writes) to perform the redistribution. In an implementation, the source device and destination device pairs may be encoded in the form of a map or other suitable data structure that indicates how each slab is to be moved. As long as the data is sufficiently distributed to begin with and reserved space is available on each storage device, the pairs may be formed to include most if not all of the storage devices rather than just a few. As the number of storage devices included in the pairs increases, the number of parallel tasks that are possible also increases.

Using the source device and destination device pairs, the disk manager module 118 may proceed to determine sets of corresponding processing tasks that may be performed in parallel. To do so, the disk manager module 118 may make multiple passes to identify and group together pairs that each use different individual storage devices. If a task is encountered that involves a storage device that is already included in a given group, the task is skipped and may be placed into a different group in a subsequent pass. In each pass, the disk manager module 118 may fill the group with as many different storage devices of the pool as possible. Thus, the groups are formed such that for each group the source device and destination device pairs included in the group contain no more than one instance of each individual one of the physical storage devices. In other words, a particular storage device is placed just once within any given group and is not repeated within a group. Using a one hundred storage device pool as an example, the disk manager module 118 may in each pass attempt to find and group fifty pairs that involve each of the one hundred storage devices. The disk manager module 118 then schedules the grouped tasks for concurrent processing at respective times. Naturally, some groups may be formed that do not include every one of the storage devices in the pool.

In each pass, the groups are derived and scheduled in a comparable manner. The disk manager module 118 systematically works through all the data to make as many matches of parallel tasks as possible. The disk manager module 118 may include or interact with a pipeline or task queue configured to manage and schedule the parallel tasks. The pipeline is configured to handle simultaneous reads/writes across the pool. The pipeline also enables system and/or administrative control over the processing and throttling of the recovery tasks for load balancing or otherwise. For example, the regeneration tasks may be paused or throttled down under high load condition. Then, regeneration tasks may be resumed or ramped back up when the load decreases. In one approach, the recovery tasks are assigned lower priority relative to application tasks (e.g., user activity) by default. In this case, application tasks have priority over the recovery tasks. However, an administrator may be provided options to selectively speed up recovery by designating different priorities or temporarily suspending application load to enable completion of recovery tasks on a situational basis.

Having considered some example details regarding various techniques for recovery and redistribution, consider now a discussion of example systems and device that may be employed to implement the various techniques in one or more embodiments.

Example System and Device

Figure 8:
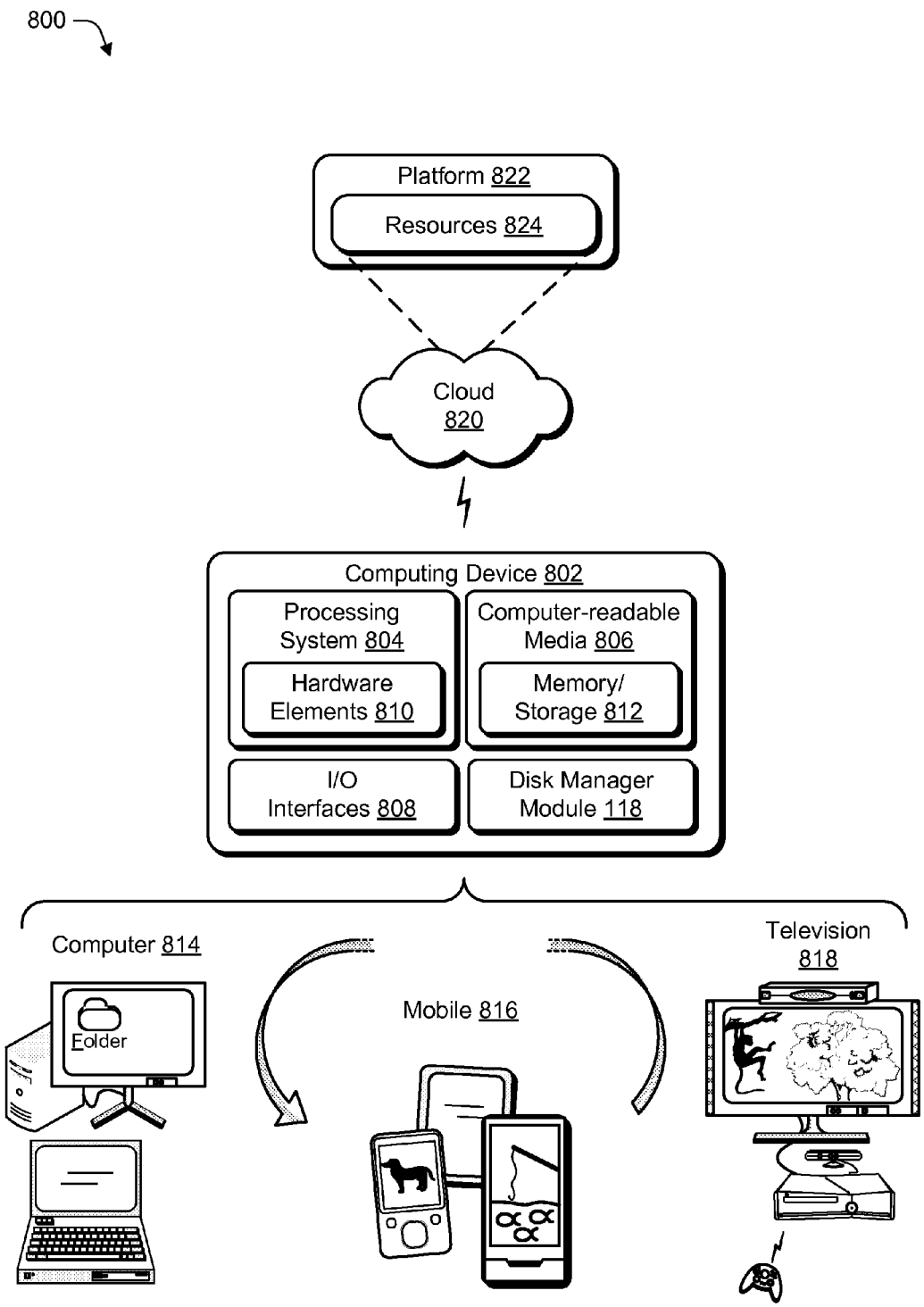
FIG. 8 depicts an example computing system in accordance with one or more embodiments.

FIG. 8 illustrates an example system 800 that includes an example computing device 802 that is representative of one or more computing systems and/or devices that may implement the various techniques described herein. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" refers to signal-bearing media configured to transmit instructions to the hardware of the computing device 802, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including operating system 110, applications 112, storage system 116, disk manager module 118, and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This is illustrated through inclusion of the disk manager module 118 on the computing device 802. The functionality of the disk manager module 118 and other modules may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    allocating reserved space for recovery on storage devices during configuration of a virtual disk;
    distributing client data and redundancy data across the storage devices in accordance with an allocation scheme that facilitates parallel recovery, wherein the allocation scheme represents a combination of multiple individual schemes that are applied selectively to different allocation operations;
    detecting failure of one or more of the storage devices; and
    recovering data from the one or more storage devices that fail using parallel tasks and the reserved space to redistribute the data across remaining storage devices that have not failed.

2. A method as described in claim 1, further comprising:
    ascertaining addition of one or more replacement storage devices to the virtual disk; and
    rebalancing data from the remaining storage devices to incorporate the one or more replacement storage devices in accordance with the allocation scheme that facilitates parallel recovery.

3. A method as described in claim 1, wherein recovering the data from the one or more storage devices that fail further comprises:
    locating counterpart data to data from the one or more storage devices that fail on the remaining storage devices;
    reconstructing data that is lost from the one or more storage devices that fail using the counterpart data; and
    determining source and destination locations for each portion of data to redistribute.

4. A method as described in claim 1, wherein the allocation scheme is configured to divide the storage devices of the virtual disk into a designated number of buckets according to capacity utilization and process the buckets from lowest to highest capacity utilization to allocate data across the storage devices of the virtual disk.

5. A method as described in claim 4, wherein the allocation scheme is further configured to select storage devices randomly within each said bucket for allocation of individual portions of data.

6. A method as described in claim 1, wherein the combination of multiple individual schemes includes at least one of a bucketed scheme or a bitmap scheme.

7. A method as described in claim 1, wherein the amount of reserved space is computed as a factor of a failure tolerance defined for the virtual to ensure that sufficient space across the remaining storage devices is available for reconstruction of data in the event that a number failures equal to the failure tolerance occurs.

8. A method as described in claim 1, wherein the redundancy data is computed using one or more of n-way parity, mirroring, or Reed-Solomon techniques.

9. One or more computer-readable storage media storing instructions that, when executed by one or more components of a computing device, implement a disk manager module configured to perform operations including:
    configuring a virtual disk for storage of client data along with redundancy data across multiple physical storage devices in accordance with a user-selected amount of redundancy data to store for resiliency;

allocating reserved space for recovery on each of the multiple physical storage devices during configuration of the virtual disk;

distributing client data and redundancy data across the physical storage devices in accordance with an allocation scheme that facilitates parallel recovery operations and is selected from multiple available schemes supported by the disk manager module including at least a bitmap scheme;

responsive to a failure of one or more physical storage devices;

reconstructing data contained on the one or more physical storage devices that failed using the redundancy data stored on remaining storage devices that have not failed; and redistributing the reconstructed data across the remaining storage devices that have not failed using the reserved space and parallel tasks.

10. One or more computer-readable storage media as recited in claim 9, wherein the disk manager module is further configured to perform operations including:

dividing the reconstructed data in slabs of a defined size;

determining source device and destination device pairs from the remaining storage devices for each slab;

identifying groups of parallel tasks for the redistribution of the reconstructed data that are executable concurrently for the source device and destination device pairs; and scheduling the groups of parallel tasks for execution together at respective times to implement the parallel recovery operations.

11. One or more computer-readable storage media as recited in claim 10, wherein identifying the groups of parallel tasks comprises forming each group such that the source device and destination device pairs included in the group contain no more than one instance of each individual one of the physical storage devices.

12. One or more computer-readable storage media as recited in claim 9, wherein the allocation scheme that facilitates parallel recovery is selected as a bucketed scheme in which the physical storage devices are divided into a designated number of buckets according to capacity utilization and the buckets are processed from lowest to highest capacity utilization to produce a distributed allocation of data for the virtual disk.

13. One or more computer-readable storage media as recited in claim 9, wherein the allocation scheme that facilitates parallel recovery is selected as a random scheme in which physical storage devices of the virtual disk are selected at random for the distribution of the client data and redundancy data across the physical storage devices.

14. One or more computer-readable storage media as recited in claim 9, wherein the allocation scheme that facilitates parallel recovery is selected as the bitmap scheme in which:

each physical storage device maintains a bitmap indicative of its relations to other physical storage devices; and data is allocated to the physical storage devices using said bitmaps to prioritize and select combinations of the physical storage devices that have not been established for allocation of each particular portion of data to relocate.

15. One or more computer-readable storage media as recited in claim 9, wherein the user-selected amount of redundancy data to store for resiliency is selectable via a configuration interface exposed during configuration of the virtual disk at a plurality of amounts between a minimal amount to enable data recovery at the specified tolerance and an amount to duplicate the client data.

16. A computing system comprising:

one or more processing components;

one or more computer-readable storage media storing instructions that, when executed by the one or more processing components, implement a storage scheme for a virtual disk configured to perform operations including:

ascertaining data chunks to process for a recovery operation associated with the virtual disk that includes multiple physical storage devices;

determining source device and destination device pairs for each data chunk from the multiple physical storage devices, including organizing source data into slabs of a designated size and processing the slabs one-by-one to match sources of the slabs to destinations to generate the source device and destination device pairs for each slab;

identifying processing tasks for the recovery operation that are executable concurrently for the source device and destination device pairs;

scheduling the identified processing tasks for execution at a particular time; and executing the identified processing tasks in parallel at the particular time.

17. A computing system as described in claim 16, wherein the recovery operation comprises redistribution of client data stored on the virtual disk responsive to failure of one or more of the physical storage devices.

18. A computing system as described in claim 16, wherein the recovery operation comprises rebalancing of client data stored on the virtual disk responsive to addition of one or more replacement storage devices to replace devices that have failed.

19. A computing system as described in claim 16, wherein sources of the slabs are matched to destinations to ensure distribution of the slabs across the available storage devices.

20. A computing system as described in claim 16, wherein identifying processing tasks for the recovery operation that are executable concurrently comprises forming groups of the source device and destination device pairs associated with the processing task such that physical storage devices of the source device and destination device pairs included in each group are not repeated within a group.

* * * * *